United States Patent [19]

Karlsson

[11] Patent Number: 5,498,842
[45] Date of Patent: Mar. 12, 1996

[54] MUFFLER FOR AN INTERNAL COMBUSTION ENGINE

[75] Inventor: Tord E. R. Karlsson, Huskvarna, Sweden

[73] Assignee: Aktiebolaget Electrolux, Stockholm, Sweden

[21] Appl. No.: 329,995

[22] Filed: Oct. 27, 1994

[30] Foreign Application Priority Data

Nov. 19, 1993 [SE] Sweden .................................. 9303843

[51] Int. Cl.⁶ .................................................. F01N 3/02
[52] U.S. Cl. ........................... 181/230; 181/265; 60/299; 60/302
[58] Field of Search ..................................... 181/230, 231, 181/232, 240, 258, 265, 283; 60/299, 302

[56] References Cited

U.S. PATENT DOCUMENTS

| | | |
|---|---|---|
| 4,867,270 | 9/1989 | Wissmann et al. . |
| 4,890,690 | 1/1990 | Fischer et al. ........................... 181/240 |
| 5,043,147 | 8/1991 | Knight ................................. 181/258 X |
| 5,048,290 | 9/1991 | Lavenius et al. . |
| 5,338,903 | 8/1994 | Winberg .................................. 181/231 |

*Primary Examiner*—Khanh Dang
*Attorney, Agent, or Firm*—Pearne, Gordon, McCoy & Granger

[57] ABSTRACT

A muffler for a two-stroke internal combustion engine having a housing and a partition wall which cooperate to define a first chamber adjacent an engine exhaust port and a second chamber remote from the engine. A catalyzer element is housed within the second chamber. A discharge pipe extends from an outlet of the catalyzer element and through the first chamber to atmosphere. An outer pipe surrounds a portion of the discharge pipe within the first chamber and cooperates therewith to define a passage whereby exhaust gas within the first chamber is directed through the partition wall and into the second chamber. Heat from the treated exhaust gas flowing through the discharge pipe is transferred to the exhaust gas flowing through the passage to preheat the exhaust gas prior to reaching the catalyzer element, thereby reducing the time required to bring the catalyzer element to an operating temperature following engine start-up.

3 Claims, 1 Drawing Sheet

MUFFLER FOR AN INTERNAL COMBUSTION ENGINE

BACKGROUND OF THE INVENTION

1. Field of the Invention

The present invention generally relates to mufflers for two-stroke internal combustion engines and, more particularly, to such mufflers which incorporate catalyzers to treat the exhaust gases from the engine.

2. Description of the Related Art

The invention is primarily related to small engines of the type used, for example, in portable power-driven tools, such as chain saws. In mufflers provided with a catalyzer element or catalyst, in general, and in mufflers for small engines, in particular, it is preferable that the catalyst begin its full operation as soon as possible after starting of the engine in order to reduce the discharge of impure gases to the largest possible extent. In order to operate properly, the catalyst must have the right temperature and it is important, therefore, that the catalyst be heated as rapidly as possible after starting of the engine.

The catalyst mufflers known in the art do not rapidly heat the catalyzer element, and therefore, do not effectively treat exhaust gases following starting of the engine. Therefore, there exists a need in the art for a catalyzer muffler which rapidly heats the catalyzer element so that the catalyzer can begin effective treatment of the exhaust gases soon after the engine is started.

SUMMARY OF THE INVENTION

It is an object of the present invention to reduce the heating time of the catalyst for the purpose of reducing the discharge of impure or insufficiently purified exhaust gases. Another object is to reduce the temperature of the exhaust gases leaving the muffler for the purpose of reducing the risk of flame-forming and fire caused thereby.

In accordance with the present invention, the muffler comprises a housing having first and second chambers. The chambers are separated from one another by a partition wall and adapted to receive an exhaust gas flow from the engine passing in turn through the chambers. The second chamber contains a catalyst connected via a discharge pipe to atmosphere. The discharge pipe extends through the first chamber for preheating the engine exhaust gases flowing to the catalyst. An outer pipe surrounds the discharge pipe. A passage is formed between the discharge and outer pipes, and untreated exhaust gas flows through the passage from the first chamber to the second chamber.

BRIEF DESCRIPTION OF THE DRAWINGS

The invention will be described in more detail below with reference to the accompanying drawing, which illustrates a cross-section of a preferred embodiment of the muffler according to the invention.

DETAILED DESCRIPTION OF THE PREFERRED EMBODIMENT

Figure 1:
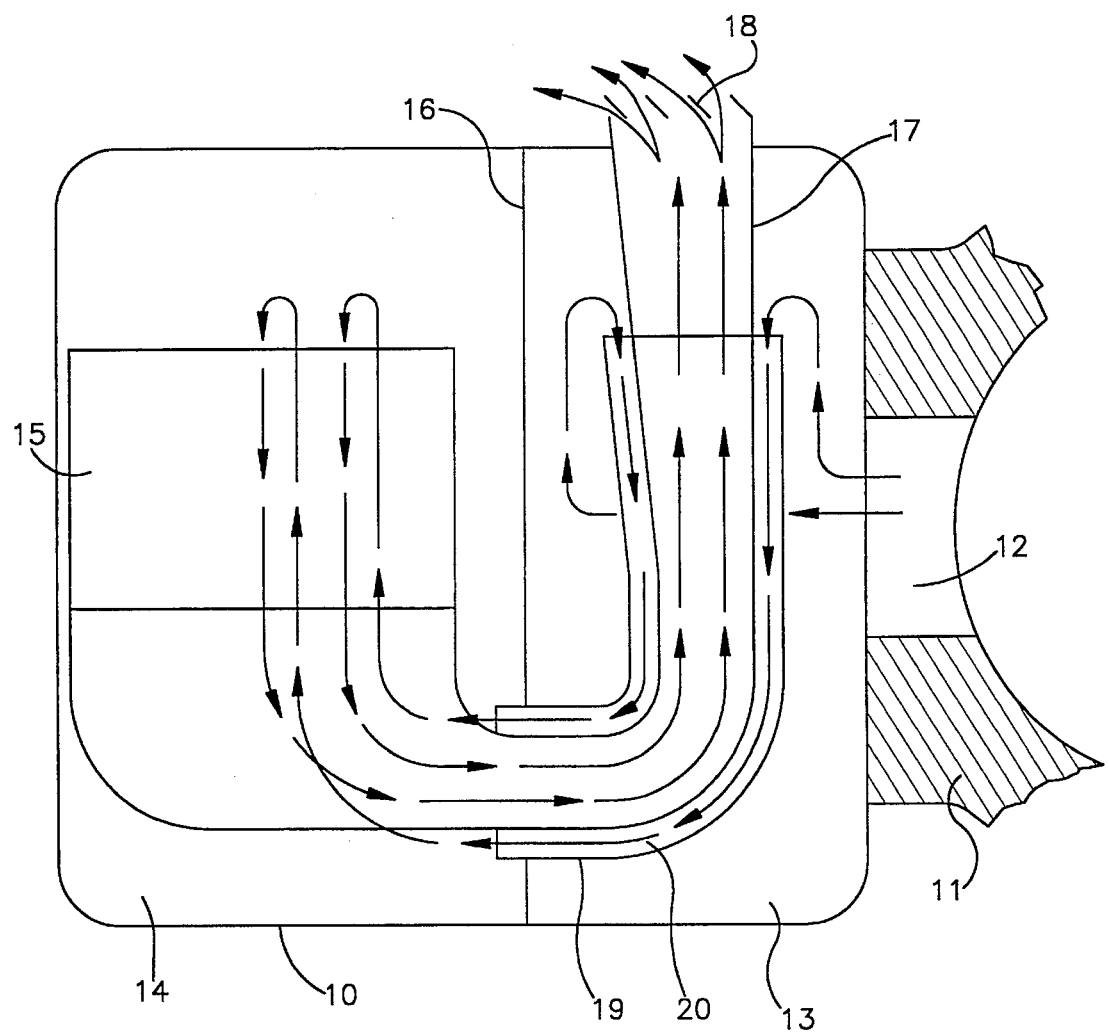

The muffler shown in the drawing comprises a housing 10 attached to a partially-shown cylinder 11 having an exhaust port 12. The housing has a first chamber 13 adjacent to the exhaust port 12, and a second chamber 14 remote from the exhaust port 12 containing a catalyst 15. The chambers 13, 14 are separated by a partition wall 16. A discharge pipe 17 extends from the catalyst 15, through the partition wall 16 and first chamber 13, and opens into the atmosphere via a discharge opening 18 provided with a grating or flame arrestor. The discharge pipe 17 is partially surrounded by an outer pipe 19, whereby an annular gas passage 20 is formed between the two pipes. The outer pipe 19 has one end which issues into the second chamber 14 and an opposite end within the first chamber 13, as illustrated.

As is shown by arrows in the Figure, the exhaust gases from the engine flow from the exhaust port 12 into the first chamber 13 and are further conducted through the passage 20 into the second chamber 14. In the second chamber 14, the exhaust gases flow through the catalyst 15 and into the discharge pipe 17. A flow of purified or treated gas is discharged from the discharge pipe 17 via the discharge opening 18.

Unburnt fuel contained in the exhaust gases from the engine is burnt in the catalyst 15 in an exothermic reaction, leading to an elevated temperature of the treated gas flow leaving the catalyst, when the activation thereof has started. A portion of the content of heat of this treated gas flow is transferred or exchanged, via the discharge pipe 17, to the exhaust gas flowing in the surrounding passage 20. By this heat exchange, heat produced in the catalyst 15 is returned to the exhaust gas entering the catalyst 15 which thereby reaches its correct operational temperature more rapidly. This reduces the time period after starting of the engine during which the operation of the catalyst 15 is unsatisfactory which, in turn, results in a reduction in the produced amount of harmful substances in the exhaust gases emitted through the discharge opening 18.

The described heat exchange also results in a temperature reduction of the treated exhaust gas discharged through the discharge opening 18, which is advantageous in that the risk of causing a fire or a burn injury is reduced.

It should be observed that a heat exchange between the incoming and discharge flows of the catalyst would take place even without the outer pipe 19, since the discharge pipe 17 extends through the first chamber 13. It should be easily realized, however, that the provision of the surrounding passage 20 results in a considerably more efficient heat exchange which is obtained in that the gas flow in the passage 20 is brought into close contact with the discharge pipe 17.

Although the preferred embodiment of the present invention has been described in the foregoing, it should be apparent that the invention is not limited to the disclosed embodiment, but rather is capable of numerous rearrangements, modifications, and substitution of parts and elements without departing from the scope and spirit of the invention as defined in the claims appended hereto.

What is claimed is:

1. A muffler for an internal combustion engine, comprising a housing (10) having first and second chambers (13, 14), said chambers being separated by a partition wall (16), said first chamber being adapted to receive exhaust gas discharged from the engine, said second chamber (14) having a catalyzer element (15) for treating exhaust gas, whereby exhaust gas passes from said second chamber to said catalyzer element, a discharge pipe (17) connecting said catalyzer element to atmosphere, said discharge pipe extending through said first chamber (13) and conducting exhaust gas from said catalyzer element to atmosphere, and an outer pipe (19) surrounding said discharge pipe (17) and cooperating with said discharge pipe to define a passage (20), whereby exhaust gas passes through said passage as it flows from said first chamber to said second chamber and is heated by said discharge pipe as it flows through said passage and is thereby pre-heated prior to reaching said catalyzer element.

2. A muffler for an internal combustion engine, comprising a housing, a partition wall, a catalyzer element, a discharge pipe, and an outer pipe, said partition wall cooperating with said housing to define a first chamber adapted to receive exhaust gases from the engine and a second chamber in which said catalyzer element is contained, said discharge pipe extending from said catalyzer element, through said partition wall and first chamber to atmosphere, said outer pipe surrounding a portion of said discharge pipe within said first chamber and extending through said partition wall, whereby exhaust gas flows through said first chamber, into a passage between said outer pipe and said discharge pipe and into said second chamber, through said second chamber into said catalyzer element, through said catalyzer element into said discharge pipe, and through said discharge pipe to atmosphere.

3. A method for treating exhaust gases produced by an internal combustion engine having a muffler comprising a housing, a partition wall, a catalyzer element, a discharge pipe, and an outer pipe, the partition wall cooperating with the housing to define a first chamber adapted to receive the exhaust gases from the engine and a second chamber in which the catalyzer element is contained, said method comprising the steps of:

introducing exhaust gases into said first chamber;

communicating said exhaust gases from said first chamber to said second chamber through a passage being defined by an annular space between said discharge pipe and said outer pipe;

passing said exhaust gases in said second chamber through said catalyzer element within said second chamber to thereby produce treated exhaust gas at an elevated temperature;

passing said treated exhaust gas from said catalyzer element through said discharge pipe;

heating exhaust gas within said passage by heat transferred from said treated exhaust gas passing through said discharge pipe while simultaneously cooling said treated exhaust gas; and, exhausting said cooled treated exhaust gas from said discharge pipe to atmosphere.

* * * * *